Figure 1:
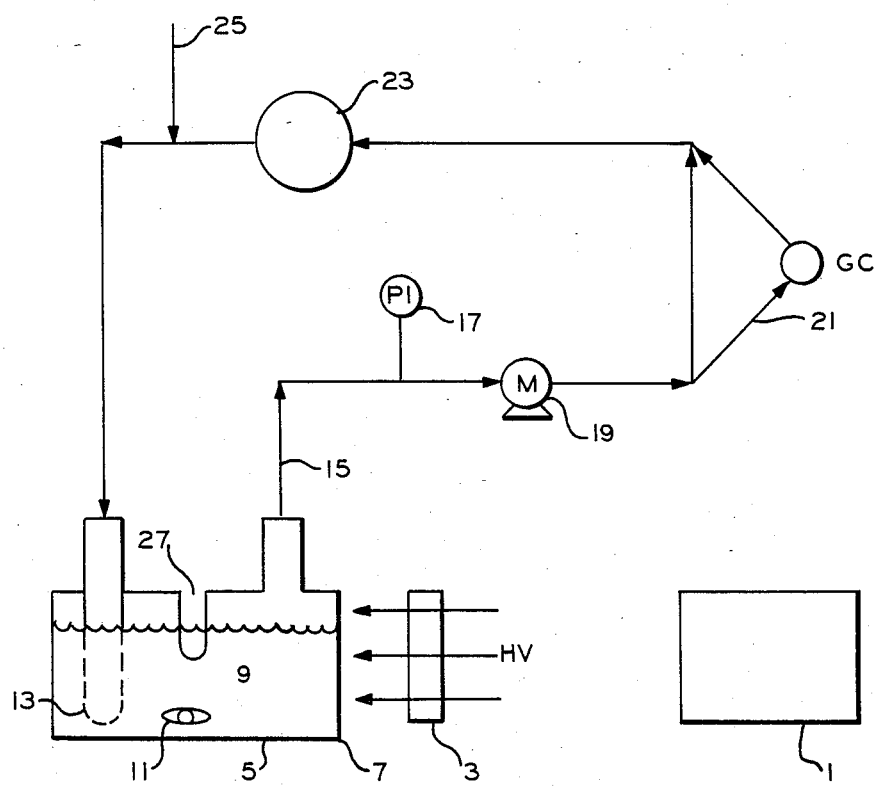

United States Patent [19]

Kolts

[11] Patent Number: 4,602,988
[45] Date of Patent: Jul. 29, 1986

[54] PHOTOCHEMICAL PRODUCTION OF HYDROGEN FROM HYDROGEN SULFIDE

[75] Inventor: John H. Kolts, Bartlesville, Okla.

[73] Assignee: Phillips Petroleum Company, Bartlesville, Okla.

[21] Appl. No.: 743,546

[22] Filed: Jun. 11, 1985

[51] Int. Cl.$^4$ .............................................. B01J 19/12
[52] U.S. Cl. ................................................ 204/157.52
[58] Field of Search .................................. 204/157.1 R

[56] References Cited

U.S. PATENT DOCUMENTS 4,090,847 5/1978 Becker et al. ...................... 23/230 R
4,094,751 6/1978 Nozik ..................................... 204/80

FOREIGN PATENT DOCUMENTS 0066540 12/1982 European Pat. Off. ..... 204/157.1 R

OTHER PUBLICATIONS

Chemical and Engineering News, pp. 40–42, Jul. 27, 1981, "Visible Light Cleaves Hydrogen Sulfide".

*Primary Examiner*—Howard S. Williams
*Attorney, Agent, or Firm*—A. W. Umphlett

[57] ABSTRACT

$H_2$ is produced from $H_2S$ dissolved in an alkaline aqueous medium by irradiating the alkaline aqueous solution of $H_2S$ using light in the visible range in the presence of a catalytic amount of a compound chosen from the group of ZnO, ZnO-RuO$_2$, ZnS, ZnSe and CuGaS$_2$.

20 Claims, 3 Drawing Figures

PHOTOCHEMICAL PRODUCTION OF HYDROGEN FROM HYDROGEN SULFIDE

BACKGROUND OF THE INVENTION

This invention relates to photolysis. In one of its aspects this invention relates to the production of hydrogen from hydrogen sulfide. In a further aspect of this invention it relates to the photolysis of hydrogen sulfide to produce hydrogen. In another of its aspects it relates to the photolysis of hydrogen sulfide in liquid solutions. In still another aspect of this invention it relates to the presence of alkaline compounds in liquid solutions useful in the photolysis of hydrogen sulfide.

The photolysis of hydrogen sulfide using light in the visible range is important because it makes possible the use of our most abundant and cheapest source of energy—the sun. It is readily recognizable that the ability to destroy a noxious pollutant by treating an aqueous solution of the pollutant with solar energy can be an economical advantage. It is also recognizable that the use of hydrogen sulfide as an economical source of hydrogen and sulfur can also be of great importance.

It is therefore an object of this invention to provide a method for the photolysis of hydrogen sulfide to produce hydrogen. It is another object of this invention to provide a process for the production of hydrogen that is dependent upon the use of solar energy. It is still another object of this invention to provide a method for the destruction of hydrogen sulfide that is ecologically sound and that is dependent on the use of solar energy.

Other aspects, objects and the various advantages of this invention will become apparent upon study of this specification, the drawings, and the appended claims.

STATEMENT OF THE INVENTION

According to this invention a method is provided for producing hydrogen from a solution of hydrogen sulfide dissolved in water. In the method hydrogen sulfide is dissolved in an aqueous solution of alkaline solvent to produce a solution of hydrogen sulfide in aqueous alkaline solvent which is then irradiated with light in the visible range in the presence of a catalytic amount of a compound chosen from the group of $ZnO$, $ZnO$—$RuO_2$, $ZnS$, $ZnSe$ and $CuGaS_2$.

For the purposes of this invention, visible light is defined as radiation having a wave length of about 300 nanometers (nm) to about 770 nm. The visible range of radiation overlaps ultra-violet radiation at the end of the range with shorter wave lengths and overlaps the infra-red range at the upper end of longer wave lengths. A preferred range of wave lengths for radiant energy useful in the invention can be described as about 300 nm to about 700 nm with the most preferred range of about 300 nm to about 400 nm.

Although the alkaline liquid medium in which hydrogen sulfide is dissolved in the process of this invention is preferably an aqueous solution of an alkaline compound, the alkaline liquid medium can be any liquid medium that is of alkaline pH and in which hydrogen sulfide can be dissolved. Among suitable solvents for hydrogen sulfide which can be made alkaline by the addition of a soluble alkaline compound are alkylpyrrolidones such as N-methylpyrrolidone and N-ethylpyrrolidone and aliphatic alcohols, preferably those having 1 to 5 carbon atoms.

Although any alkaline compound compatible with solvents in which hydrogen sulfide can be dissolved are useful in the present invention, the hydroxides of alkali and alkaline earth metals are particularly useful because of their availability and relative inexpensiveness. Ammonium hydroxide also falls within the particularly useful category because of availability and inexpensiveness.

In the process of the present invention the presence of an amount of alkaline compound in the aqueous solution sufficient to provide a detectable alkalinity of the solution is necessary for the operation of the invention. Preferably the concentration of alkaline compound is in a range of about 0.1 mole per liter of solution to about 10 moles per liter solution, and most preferably the concentration of alkaline compound is in a range of about 2 to about 8 moles per liter solution.

Although any quantity of the catalyst compounds—$ZnO$, $ZnO$—$RuO_2$, $ZnS$, $ZnSe$ or $CuGaS_2$—dispersed in the solution of hydrogen sulfide in alkaline aqueous solution is useful in promoting the photolysis of the hydrogen sulfide, it is preferred that the catalyst be present in an amount of about 0.2 to about 2.0 grams catalyst per 100 grams solution and most preferably be present in an amount of about 1.0 to about 1.3 grams of catalyst per 100 grams of solution.

Figure 2:
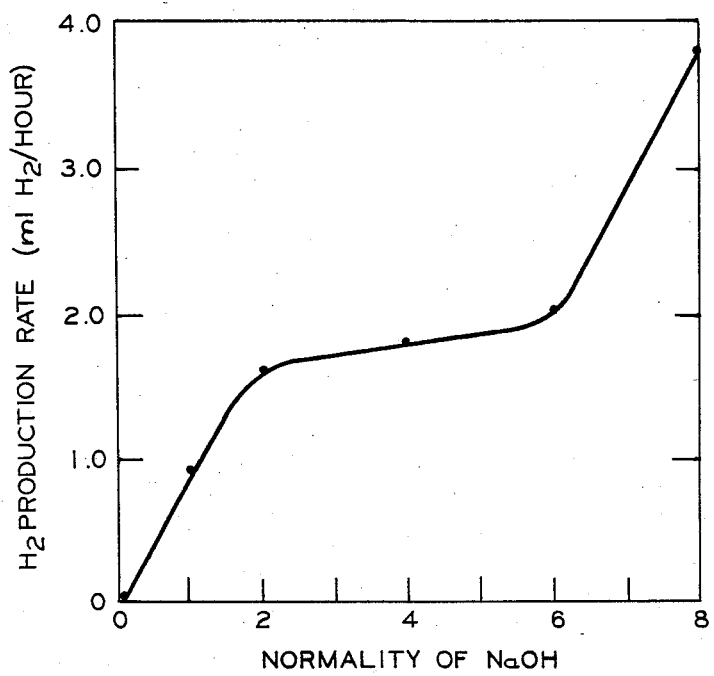
Figure 3:
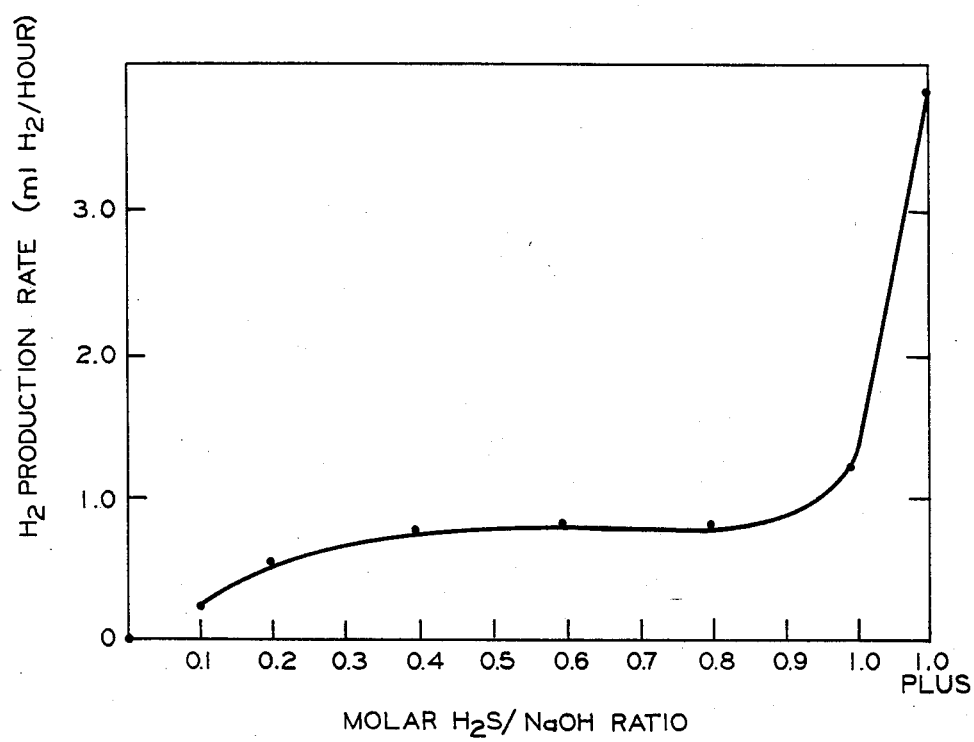

The invention can be best understood by studying the examples that follow in conjunction with the drawing in which:

FIG. 1 is a line diagram of the apparatus used in carrying out the process of this invention, FIG. 2 is a graphic representation of the relationship between the hydrogen production rate and the normality of the alkaline solution in which the $H_2S$ is dissolved, and FIG. 3 is a graphic representation of the hydrogen production rate as related to the molar ratio of hydrogen sulfide to alkaline compound in the solution in which a hydrogen sulfide is dissolved.

The examples that follow should be taken as illustrative and not as exclusive.

EXAMPLE I

In this example the experimental setup for the production of hydrogen gas by photo-induced decomposition of hydrogen sulfide solutions is described.

The apparatus used for the photolysis is shown in FIG. 1. An Oriel Corporation 250 watt or 90 watt high pressure mercury lamp 1 was employed as the light source. In those examples where the 90 watt lamp was used, data have been normalized to the photon flux of the 250 watt lamp. The emitted light passed through a Pyrex glass filter 3 (in addition to the Pyrex window of the photolytic cell) so as to filter out all uv radiation below a wavelength of about 290 nanometers (nm). The absolute quantum efficiencies of the 250 watt mercury lamp were calibrated by Reineckate's Salt Actinometry (described in *Journal of The Americal Chemical Society*, 88, pages 394 ff., 1966) using three band pass filters. The calibrated photon flux for each of the filters was:

| Bandpass (nm) | Flux (quanta/min.) |
| --- | --- |
| 440 | $3.1 \times 10^{18}$ |
| 400 | $2.0 \times 10^{19}$ |
| 350 | $1.2 \times 10^{19}$ |

Visible light that passed through filter 3 entered the photolytic cell 5 through Pyrex window 7. The $H_2S$- containing solution 9 to be photolytically decomposed was stirred by means of magnetic stirring bar 11. The H₂S-containing feed gas was introduced through bubbler tube 13, the H₂-containing product gas exited through line 15 equipped with a pressure gauge 17 and a gas recirculation pump 19. A small portion of the product gas was diverted to a gas chromatograph through GC loop 21 for analysis of the product gas stream.

The major portion of the product gas was pumped into a 250 cc gas ballast container 23 and was recycled to the photolytic cell 5. Fresh $H_2S$ was introduced through auxiliary gas inlet 25. The photolytic cell was equipped with a thermocouple well 27 for measuring the temperature of the solution (generally 26°–34° C.).

The quantum efficiency of the photolytic apparatus is defined as:

$$\frac{\text{molecules } H_2 \text{ per hour}}{\text{quanta per hour entering Cell}} \times 4$$

The multiplication factor 4 takes into account that the formation of one $H_2$ molecule from $H_2S$ requires 4 quanta of light (as demonstrated in *Helvetia Chimica Acta*, 65, pages 243 ff., 1982). It was assumed that all light entering the photolysis cell was absorbed.

EXAMPLE II

In this example the photolysis of saturated solutions of $H_2S$ in aqueous 8 molar (8 normal, 8N) NaOH containing various dispersed semiconductors as photocatalysts, at levels of 1.0–1.3 grams catalyst per 100 grams solution. The dispersion of the finely ground semi-conductor powders in aqueous NaOH was carried out by means of a sonic vibrator. The suspension was stirred during tests by means of a magnetic stirrer (see FIG. 1). Most photocatalysts used were provided by Cerac Ultrapure, Milwaukee, Wisc. Several were prepared in the laboratory.

$CdS/RuO_2$ was prepared by mixing a solution containing 4.3 g $Cd(NO_3)_3$, 0.004 g $RuCl_3$ and 50 mL $H_2O$ with a saturated $H_2S$ solution containing also 64 g NaOH and 150 mL $H_2O$.

$ZnO/RuO_2$ was prepared by dissolving 0.5 g of $RuO_4$ in 20 ml $H_2O$ in the dark. Separately, 10 g of ZnO was added to 450 ml of degassed $H_2O$. Each of these were alternately stirred and placed in sonic vibrator for ~40 minutes. At this point 2.5 ml of the $RuO_4$ solution was added to the ZnO suspension. This mixture was then stirred for ~10 hours while being irradicated with a 75 watt flood lamp.

$CuGaS_2$ was prepared as follows: 5.0 g $GaCl_3$ (0.028 moles) and 6.58 g $Cu(NO_3)_2$ (0.028 moles) were dissolved in $H_2O$. $H_2S$ was bubbled through this solution for about 1 hour. The precipitate was collected on a filter, dried in a forced draft oven at 160° C., and calcined for about 3 hours as 400° C. in a nitrogen atmosphere containing about 1% $H_2S$.

Results of the photolysis of $H_2S$ dissolved in alkaline solutions (8N NaOH) containing dispersed semiconductors are summarized in Table I.

TABLE I

| Run | Dispersed Semi-Conductor | Molar Ratio $H_2S/NaOH$ | Rate[a] (ml $H_2$/hr) | Comments |
|---|---|---|---|---|
| 1 (Control) | CdS | 1 plus[b] | 1.8 | CdS prepared from $Cd(NO_3)_2$ in-situ |
| 2 (Control) | $CdS/RuO_2$ | 1 plus | 3.8 | CdS from $Cd(NO_3)_2$ Ru from $RuCl_3$ |
| 3 (Control) | CdSe | 1 plus | 0.9 | From Cerac Ultrapure |
| 4 (Control) | CdO | 0.5[c] | 0.0 | CdO at 1 plus formed CdS |
| 5 (Invention) | ZnO | 1 plus | 5.9 | |
| 6 (Invention) | $ZnO/RuO_2$ | 1 plus | 5.4 | $RuO_2$ added as $RuCl_3$ |
| 7 (Invention) | ZnS | 1 plus | 0.9 | From Cerac Ultrapure |
| 8 (Invention) | ZnSe | 1 plus | 2.5 | From Cerac Ultrapure |
| 9 (Control) | ZnTe | 1 plus | — | Decomposed in Solution |
| 10 (Invention) | $CuGaS_2$ | 1 plus | 1.9 | Lab preparation |
| 11 (Control) | $TiO_2/RuO_2$ | 1 plus | 0.3 | |
| 12 (Control) | SiC | 0.5 | 0.0 | From Cerac Ultrapure |
| 13 (Control) | AlAs | 0.5 | 0.0 | From Cerac Ultrapure |
| 14 (Control) | GaP | 0.5 | 0.0 | From Cerac Ultrapure |
| 15 (Control) | $Fe_2O_3$ | 0.5 | 0.0 | Decomposed after 1 hour |
| 16 (Control) | None | 1 plus | 0.8 | |

[a]Rate is average value taken over 6 hour period.
[b]1.0 plus refers to $H_2S$ saturated NaOH solution with $H_2S$ atmosphere above solution.
[c]At an $H_2S/NaOH$ ratio of 0.5, an $N_2$ atmosphere was used.

Data in Table I show that invention runs with dispersions of ZnO, $ZnO/RuO_2$, ZnS, ZnSe and $CuGaS_2$ in aqueous 8N NaOH produced hydrogen at rates comparable to or higher than several Cd compounds (reported in *Chemical and Engineering News*, P. 40–42, July 27, 1981). The dispersions used in invention runs were also superior to NaOH alone. Several listed semiconductor dispersions actually inhibited the production of $H_2$ by photolysis of $H_2S$.

EXAMPLE III

The effects of the NaOH concentration and of the $H_2S/NaOH$ on the production rate of $H_2S/NaOH$ on the production rate of $H_2$ were investigated for one photocatalyst dispersion (0.5 g $CdS/RuO_2$ in 150 g aqueous NaOH solution). Results presented in FIG. 2 show that the normality of the base solution should be at least about 0.1N so as to generate $H_2$ at appreciable rates. The preferred NaOH concentration exceeded about 1N, and most preferably was about 6–8N.

FIG. 3 shows that the preferred molar $H_2S/NaOH$ ratio was about 1.0 and above. It is belived that the active $H_2$-generating species is a complex of $HS^-$ ions and $H_2S$, and that said complex lowers the energy required for the decomposition of $H_2S$.

EXAMPLE IV

In this example the effect of the wavelength of light on the quantum efficiency of the photo-induced decomposition of $H_2S$ dissolved in 8N NaOH, in the presence of dispersed semiconductors as photocatalysts is described. Measured quantum efficiencies are summarized in Table II.

TABLE II

| Dispersed Photocatalyst | 350 nm BP Filter | 400 nm BP Filter |
|---|---|---|
| CdS | 1.1% | 0.2% |
| CdS/1% $RuO_2$ | 3.3% | 1.1 |
| ZnO | 5.1 | 0.0 |
| $CuGaS_2$ | 1.0 | 0.0 |

Data in Table II show that CdS, ZnO and $CuGaS_2$ were effective only at wavelengths of <400 nm. Only $CdS/RuO_2$ was effective at 400 nm. As in all previous tests, uv light (<300 nm) was filtered out by means of Pyrex filters.

I claim:

1. A method for producing hydrogen from a solution of $H_2S$ dissolved in $H_2O$ comprising:
   (a) dissolving $H_2S$ in an alkaline aqueous solvent to produce a solution of $H_2S$ in alkaline aqueous solvent, and
   (b) irradiating said solution of $H_2S$ in alkaline aqueous solvent in the presence of a catalytic amount of a compound chosen from the group consisting of ZnO, ZnS, ZnSe and $CuGaS_2$ with light in the visible range of about 300 nm to 700 nm.

2. A method of claim 1 wherein the concentration of alkaline compound in the alkaline aqueous solvent is in a range of about 0.1 mole per liter solution to about 10 moles per liter solution.

3. A method of claim 2 wherein said alkaline compound is chosen from among NaOH and $NH_4OH$.

4. A method of claim 3 wherein said alkaline compound is NaOH.

5. A method of claim 4 wherein the concentration of alkaline compound in the alkaline aqueous solution is in a range of about 2 moles per liter solution to about 8 moles per liter solution.

6. A method of claim 5 wherein said catalytic amount of compound is in a range of about 0.2 to about 2.0 grams per 100 grams solution.

7. A method of claim 3 wherein said catalytic amount of compound is in a range of about 0.2 to about 2.0 grams per 100 grams solution.

8. A method of claim 1 wherein said catalytic amount of compound is in a range of about 0.2 to about 2.0 grams per 100 grams solution.

9. A method of claim 1 wherein said compound present in the catalytic amount is ZnO.

10. A method of claim 1 wherein said compound present in the catalytic amount is ZnS.

11. A method of claim 1 wherein said compound present in the catalytic amount is ZnSe.

12. A method of claim 1 wherein said compound present in the catalytic amount is $CuGaS_2$.

13. A method for producing hydrogen from a solution of $H_2S$ dissolved in $H_2O$ comprising:
   (a) dissolving $H_2S$ in an alkaline aqueous solvent to produce a solution of $H_2S$ in alkaline aqueous solvent, and
   (b) irradiating said solution of $H_2S$ in alkaline aqueous solvent in the presence of a catalytic amount of $ZnO-RuO_2$ with light in the visible range of about 300 nm to about 770 nm.

14. A method of claim 13 wherein the concentration of alkaline compound in the alkaline aqueous solvent is in a range of about 0.1 mole/liter (l) of water to about 10 moles/l of water.

15. A method of claim 14 wherein said alkaline compound is chosen from among NaOH and $NH_4OH$.

16. A method of claim 15 wherein said alkaline compound is NaOH.

17. A method of claim 16 wherein the concentration of alkaline compound in the alkaline aqueous solvent is in a range of about 2 mole/l of water to about 8 moles/l of water.

18. A method of claim 17 wherein sid catalytic amount of compound is in a range of about 0.2 to about 2.0 grams per 100 grams solution.

19. A method of claim 15 wherein said catalytic amount of compound is in a range of about 0.2 to about 2.0 grams per 100 grams solution.

20. A method of claim 13 wherein said catalytic amount of compound is in a range of about 0.2 to about 2.0 grams per 100 grams solution.

* * * * *